US008689220B2

(12) United States Patent
Prabhakar et al.

(10) Patent No.: US 8,689,220 B2
(45) Date of Patent: Apr. 1, 2014

(54) JOB SCHEDULING TO BALANCE ENERGY CONSUMPTION AND SCHEDULE PERFORMANCE

(75) Inventors: Giridhar M. Prabhakar, Bangalore (IN); Rajan Ravindran, Bangalore (IN); Chiranjib Sur, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 13/307,508

(22) Filed: Nov. 30, 2011

(65) Prior Publication Data

US 2013/0139169 A1  May 30, 2013

(51) Int. Cl.
| G06F 9/46 | (2006.01) |
| G06F 17/50 | (2006.01) |
| G06F 9/455 | (2006.01) |
| G06F 1/00 | (2006.01) |

(52) U.S. Cl.
USPC ............... 718/102; 718/103; 703/13; 703/14; 716/109; 713/300

(58) Field of Classification Search
None
See application file for complete search history.

(56) References Cited

U.S. PATENT DOCUMENTS

| 7,082,606 | B2 | 7/2006 | Wood et al. | |
| 7,155,617 | B2 | 12/2006 | Gary et al. | |
| 7,840,825 | B2 | 11/2010 | Altevogt et al. | |
| 7,913,071 | B2 | 3/2011 | Mallik et al. | |
| 2004/0199918 | A1* | 10/2004 | Skovira | 718/102 |
| 2007/0168055 | A1 | 7/2007 | Hsu et al. | |
| 2008/0155550 | A1* | 6/2008 | Tsafrir et al. | 718/103 |
| 2009/0241117 | A1* | 9/2009 | Dasgupta et al. | 718/101 |

FOREIGN PATENT DOCUMENTS

| WO | WO2010037177 A1 | 4/2010 |
| WO | WO2010048316 A1 | 4/2010 |

OTHER PUBLICATIONS

Karatza, Helen. A Simulation Model of Backfilling and I/O Scheduling in a Partitionable Parallel System. Proceedings of the 2000 Winter Simulation Conference.*
Tang, et al., "Analyzing and Adjusting User Runtime Estimates to Improve Job Scheduling on the Blue Gene/P", Department of Computer Science, Illinois Institute of Technology, Chicago, IL and Argonne National Laboratory, Argonne, IL, IEEE 2010, 11 pages.

(Continued)

*Primary Examiner* — Emerson Puente
*Assistant Examiner* — Adam Lee
(74) *Attorney, Agent, or Firm* — Katherine S. Brown; Jeffrey L. Streets

(57) ABSTRACT

A computer program product including computer usable program code embodied on a computer usable medium, the computer program product comprising: computer usable program code for identifying job performance data for a plurality of representative jobs; computer usable program code for running a simulation of backfill-based job scheduling of the plurality of jobs at various combinations of a run-time over-estimation value and a processor adjustment value, wherein the simulation generates data including energy consumption and job delay; computer usable program code for identifying one of the combinations of a run-time over-estimation value and a processor adjustment value that optimize the mathematical product of an energy consumption parameter and a job delay parameter using the simulation generated data for the plurality of jobs; and computer usable program code for scheduling jobs submitted to a processor using the identified combination of a run-time over-estimation value and a processor adjustment value.

19 Claims, 5 Drawing Sheets

(56) References Cited

OTHER PUBLICATIONS

Mukherjee, et al., "Spatio-Temporal Thermal-Aware Job Scheduling to Minimize Energy Consumption in Virtualized Heterogeneous Data Centers", Impact Lab—School of Computing and Informatics, Arizona State University, Tempe, Arizona, to appear in Computer Networks, Special Issue on Virtualized Data Centers, May 19, 2009, pp. 1-27.

* cited by examiner

JOB SCHEDULING TO BALANCE ENERGY CONSUMPTION AND SCHEDULE PERFORMANCE

BACKGROUND OF THE INVENTION

1. Field of the Invention

The present invention relates to scheduling of jobs that are being submitted to a processor that is capable of dynamic frequency and voltage scaling (DVFS).

2. Background of the Related Art

Dynamic frequency and voltage scaling (DVFS) techniques have become standard features in present-day multicore processors. These techniques allow the system or user to vary the frequency and voltage supplied to the processor statically or dynamically, therefore varying the energy spent in computation, at the expense of computational speed. For example, decreasing processor frequency at a fixed voltage allows one to decrease processor power consumption. On the other hand, computational speed is reduced, sometimes proportionately and sometimes in a smaller proportion than the decrease of processor power.

Large scale computing at petaflops and beyond would require programs to run on several hundred thousand to millions of processors. This means that the energy consumed to execute such programs will run into the order of several to tens of megawatts. At this scale, the term "performance" acquires a meaning beyond mere compute speed: "performance" means how intelligently a compute job balances speed with power consumption. To achieve this balance, frequency and voltage scaling techniques become crucial. Some programs can be relatively insensitive to small frequency and voltage variations, during some phase of their execution, and this can be favorably leveraged for an efficient high performance computing run. A lot of research has therefore been conducted into finding DVFS settings that could best trade-off power expenditure against an acceptable computational speed.

Apart from DVFS techniques for processors, investigations have also been carried looking into ways and means of reducing energy consumption by other compute hardware, such as the physical memory, disk drives, network related hardware, and the power supply. All these techniques, while reducing energy consumption, could potentially impact program performance. To generalize, therefore, in the context of the performance of applications running on current and future computing infrastructure, it is necessary to not merely consider computational efficiency, but rather, the energy-compute efficiency trade-off.

A large number of jobs are submitted to a supercomputing facility, or a data center. In order to increase the efficiency of their execution schedule, the technique of backfilling is used along with a typical scheduling algorithm, such as first come first serve (FCFS). Backfilling allows smaller jobs to "pack" into spatio-temporal gaps left by scheduled, finished and running larger jobs, thus improving the overall scheduling performance metric (such as average slowdown, or average completion time).

Parallel programs, when submitted to a data center or a supercomputing center, enter a scheduling queue. As there are other tasks waiting in the queue, or being executed on the computing resource, the submitted program is not immediately executed. Therefore, the time taken to process a submitted compute task is much larger than the run-time of the task itself, and consequently, users do not expect their programs to return quickly. Users therefore inherently allow for a slack in the time of completion and return of their submitted task. This slack itself is typically not fixed, but varies, increasing when the load on the data center is large.

One of the recent and emerging study areas in energy-efficient computing is energy-aware scheduling. DVFS-based energy aware scheduling (or another energy-optimization technique) is applied to jobs submitted in a schedule, the run-time of those jobs will often increase. Some of the approaches taken to mitigate this problem include selecting jobs for which run times are relatively less affected by DVFS, or applying DVFS during low-utilization periods, and to leverage the slack allowed by users due to the load on the data center, given their deadline constraints.

BRIEF SUMMARY OF THE INVENTION

Another embodiment of the invention provides a computer program product including computer usable program code embodied on a computer usable medium, the computer program product comprising: computer usable program code for identifying job performance data for a plurality of representative jobs; computer usable program code for running a simulation of backfill-based job scheduling of the plurality of jobs at various combinations of a run-time over-estimation value and a processor adjustment value, wherein the simulation generates data including energy consumption and job delay; computer usable program code for identifying one of the combinations of a run-time over-estimation value and a processor adjustment value that optimize the mathematical product of an energy consumption parameter and a job delay parameter using the simulation generated data for the plurality of jobs; and computer usable program code for scheduling jobs submitted to a processor using the identified combination of a run-time over-estimation value and a processor adjustment value.

DETAILED DESCRIPTION OF THE INVENTION

Figure 1:
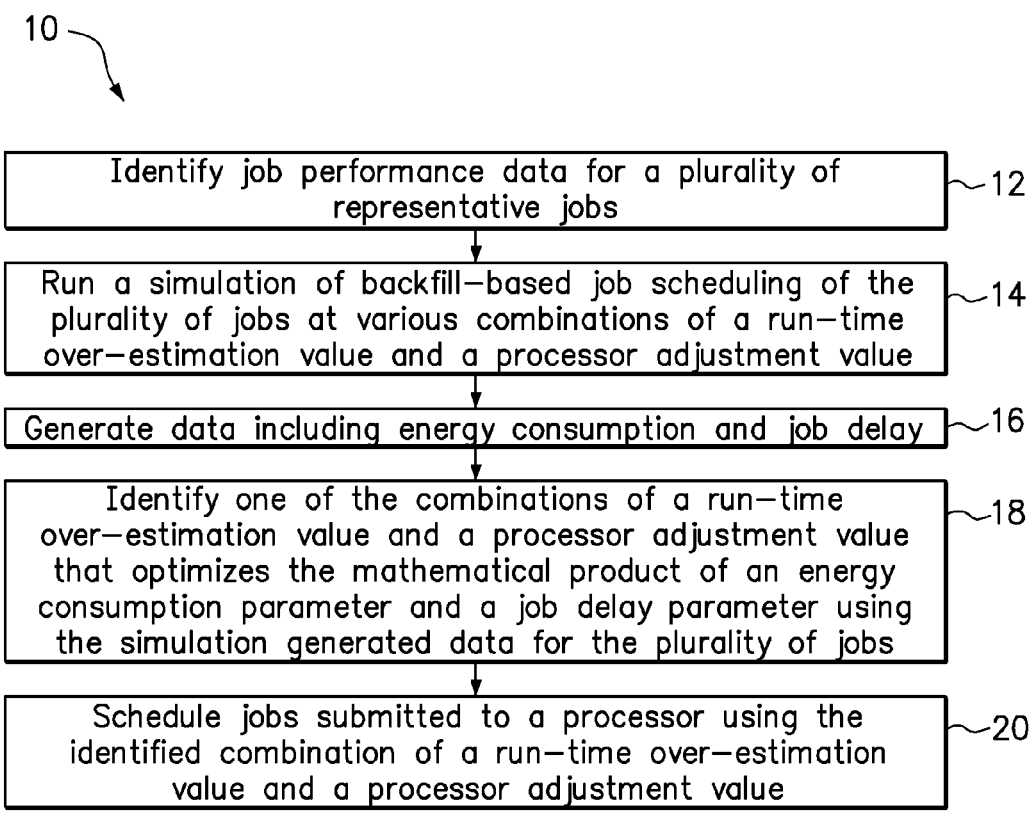
FIG. 1 is a flowchart of an energy-aware backfill scheduling method in accordance with one embodiment of the present invention.

One embodiment of the present invention provides a computer-implemented method for job scheduling in a manner that balances energy consumption and schedule performance. The method comprises identifying job performance data for a plurality of representative jobs and running a simulation of backfill-based job scheduling of the plurality of jobs at various combinations of a run-time over-estimation value and a processor adjustment value, wherein the simulation generates data including energy consumption and job delay. The method further identifies one of the combinations of a run-time over-estimation value and a processor adjustment value that optimizes the mathematical product of an energy consumption parameter and a job delay parameter using the simulation generated data for the plurality of jobs. Jobs submitted to a processor are scheduled using the identified combination of a run-time over-estimation value and a processor adjustment value.

The energy-aware backfill scheduling technique combines overestimation of job run-times and processor adjustments, such as dynamic voltage and frequency scaling (DVFS), in a manner that balances overall schedule performance and energy consumption. Accordingly, some jobs in a schedule are executed in a manner reducing energy consumption, for example at a lower processor frequency or other energy minimizing technique.

Job performance data for the plurality of jobs may be identified by accessing historical job performance data. Alternatively or in addition, job performance data may be identified by calibrating each of the jobs to determine job characteristics including execution time and power consumption, wherein the job characteristics are used by the simulation.

A run-time estimate for a job is multiplied by the run-time overestimation value to determine a run-time overestimate for each job. The runtime estimates themselves may be based on historical job data or be received as user input. Embodiments of the method may use a run-time over-estimation factor that is fixed for all jobs or a number of run-time over-estimation factors that vary as a function of the job size.

A backfill scheduling method requires an estimation of task run-time, perhaps by asking the user to submit a run-time estimate, and sometimes augmented with a historical database. Once a task is submitted along with its expected run-time, a reservation of the task is made based on the primary scheduling algorithm. For example, if the primary scheduling algorithm is first-come-first-serve (FCFS), then a reservation of the task is made at the earliest time at which resources are available for the task to execute. In this manner, all incoming jobs are reserved or otherwise placed on the schedule.

Because the jobs may be unique, each job on the schedule may demand a different number of compute resources (processors). This means that, over time, as jobs are reserved to run on the compute nodes, not all processors are used at all times, leaving "holes" in the resources, which are unused. In order to improve resource utilization, the technique of backfilling is used. In this technique, tasks that have been submitted into the queue at a later time are promoted to execute earlier, provided that the required compute resources are available and the backfilled tasks do not obstruct or delay the execution of other reserved and running compute tasks.

Although job run-times may be provided through user input, it is possible to generate very good and realistic job run-time estimates based on historical user data. Accordingly, the modality in user provided run-time estimates is reduced, and run-time estimates are more accurate. Multiplying such estimates with an overestimation factor in accordance with the invention gives much improved job schedule performance.

With a first-come-first-serve (FCFS) scheduling policy, the system resource usage state is scanned from the time of job submission into the future, and the earliest time at which the necessary resources become available for the job is found. During this scan, finish times are computed for jobs that are currently running and job that are reserved in the future. If the necessary resources are unavailable until the end of the current reservation list, then the job is reserved at the end of the list.

When a running job is completed, the job queue is scanned to find the earliest job that can be run on the new resource availability configuration. Promoting a job to execute earlier due to slack or "holes" in the schedule resulting from job completion is referred to as "back-filling." If the scheduler applies run-time over-estimation, there is an increased likelihood that jobs will finish early and leave such "holes" in the schedule. Furthermore, the scheduler may apply run-time over-estimation to the newly backfilled jobs, such that early completion of the newly backfilled job may also leave a "hole" for further backfilling of jobs. Repeatedly creating smaller and smaller holes leads to backfilling in a roughly shortest-job-first (SJF) manner, which decreases the average wait time and slowness of the schedule.

Running a simulation of backfill-based job scheduling of the plurality of jobs may include promoting a job in the scheduling queue to execute earlier in response to determining that sufficient compute resources are available for the duration of the run-time over-estimate for the promoted job so that earlier execution of the promoted job will not delay execution of a reserved or running job.

The processor adjustment value is selected from a processor frequency value, a processor voltage value, and a combination thereof. While some processors may only be able to adjust frequency or voltage, some processors may be enabled for dynamic frequency and voltage scaling. The methods of the present invention may selectively utilize the processor's ability to adjust frequency, adjust voltage, or both.

A backfill-based scheduler is simulated by a computer program. To this simulation, jobs are queued as input, with the intention of 'virtually' scheduling the jobs to determine the performance of the scheduling algorithm. Thus, the input to the schedule simulation model are job characteristics such as job run-times, arrival times, deadlines (if any), number of cores needed, and other parameters, such as average power consumption (if the job is a candidate for DVFS). The job run-time overestimation factor, f, and the DVFS related parameter, d, are also given as inputs per job, to the schedule simulator.

The schedule simulation then simulates the execution of the jobs, and it is possible to estimate a schedule performance metric, such as the average wait time, for a given f and d. An optimization algorithm is applied to search for the value of a run-time over-estimation factor, f, and processor parameter, d, at which the energy-delay product is optimized (minimized). For example, the processor parameter, d, is a factor, typically a fraction, for multiplying times the CPU frequency. This means that the CPU frequency can be varied for the DVFS candidate job set. In this manner, both f and d can be varied, and it is possible to identify the value of f and d which result in an optimized value of the energy-performance measure of the schedule, such as energy-wait time product.

As stated above, the simulation optimizes the mathematical product of an energy consumption parameter and a job delay parameter. In a non-limiting example, the energy consumption parameter is the average energy reduction ratio of the plurality of jobs, where the average energy reduction ratio of the plurality of jobs is the average energy consumption without using processor adjustment value divided by the average energy consumption using the processor adjustment value. In another non-limiting example, the job delay parameter is the average wait time of the plurality of jobs.

Ultimately, each job submitted to a processor is scheduled within a scheduling queue, wherein the schedule allocates the resources necessary to run the job for the duration of the runtime overestimate. One or more processors may then execute the jobs according to the schedule. When the jobs are executed, the method will preferably further include measuring the actual energy consumption and job delay of the executed jobs, and update the job performance data to include actual energy consumption data and actual job delay data associated with the executed jobs.

Embodiments of the invention may selectively apply dynamic frequency and voltage scaling (DVFS) to some of the jobs. To determine which jobs are good DVFS candidates, one embodiment runs each of the jobs applying dynamic frequency and voltage scaling (DVFS) and runs the jobs again without applying DVFS. Then, for each of the jobs, a change in the run-time attributed to the application of DVFS is determined. One or more of the jobs can be selected as DVFS candidates, preferably beginning with jobs having the smallest change in run-time due to the application of DVFS and continuing with jobs having greater changes in run-time. It should be recognized that the smallest change in run-time indicates that running the job with energy-saving DVFS did not result in much increase in the run-time of the job. Accordingly, these jobs allow the process to benefit from the energy savings with the least amount of potential performance degradation.

In another embodiment, user input is received identifying that a newly submitted job is to be run applying dynamic frequency and voltage scaling (DVFS). Accordingly, the newly submitted job is tagged as a DVFS candidate job, and the relationship between energy consumption and job performance is modeled for the DVFS candidate job.

Optionally, the process of modeling the relationship between energy consumption and job performance for a DVFS candidate job may include: identifying system resources available in the data center; modeling the performance of the system resources for various processor frequency settings; using the performance model of the system resources to estimate the performance of a job for a given energy consumption; and storing the estimated performance and energy consumption data in association with the job. Then, in response to a DVFS candidate job being submitted for scheduling to a processor, the stored performance and energy consumption data may be used to determine a DVFS setting that is energy-performance optimal. For example, a DVFS setting that is energy performance optimal may be subject to a maximum run-time in order to prevent delaying the next scheduled job. As previously described, a DVFS setting may be the processor frequency, the processor voltage, or both. It should also be recognized that the DVFS setting may be determined separately for each DVFS candidate job or collectively for all DVFS candidate jobs. In an optional further embodiment, the DVFS setting is applied to the DVFS candidate job during execution by a processor, and the energy consumption and run-time is measured in response to running the DVFS candidate job at the DVFS setting. Still further, the step of identifying system resources available in the data center may include identifying the number and type or processor cores, their frequency settings, resultant thermal energy and power consumption.

Embodiments of the present invention make selective application of DVFS to jobs in a scheduling queue. The goal of these efforts is to find opportunities for an acceptable tradeoff between energy consumption and schedule performance. It is recognized that when DVFS is applied to some or all of the submitted jobs in the schedule, the actual run-times of some or all of these jobs may increase. This could result in an increase in the average wait time and average bounded slowdown. Accordingly, the present invention combines run-time overestimation and DVFS to achieve energy-performance optimality, rather than solely focusing on either maximizing schedule performance or minimizing energy consumption. This is achieved by optimizing an energy-delay product, which determines the run-time over-estimation factor(s) and processor attribute value(s) used in job scheduling. This new method may be referred to as Run-time Overestimate Compensated DVFS-Backfill, or simply ROC-DVFS Backfill.

When jobs are run at lower processor frequency, there is less energy consumed to perform the same job. In other words, while the compute time could increase, the corresponding energy consumed is less. In the lower frequency case, energy is used more efficiently for computation, and energy savings are observed, both in terms of reduced energy wastage, and reduced energy needed to cool the compute infrastructure. In a similar manner, the voltage of the processor may also be varied, and both frequency and voltage may therefore be controlled dynamically, in such a manner as to increase the energy efficiency of the computation (i.e., consume less energy). Dynamic frequency and voltage scaling (DVFS) is a technique for dynamically varying the processor frequency and/or voltage. It is important to note that the degree to which DVFS minimizes energy consumption is usually a tradeoff with the degree of compute performance one can expect.

In order to implement ROC-DVFS, the data center and workload characteristics should be calibrated. The calibration step is essentially a step that not only measures the characteristics of the data center and the workloads, but is also used to establish a baseline for energy consumption and workload performance (e.g., job run-times) and schedule performance (e.g., average wait time).

Calibration of the data center is performed when the ROC-DVFS methodology is being newly implemented in the data center, or periodically whenever a re-calibration is required for example due to changes in the data center infrastructure. In the data center calibration step, various systemic parameters of the data center cluster are recorded, such as the number and type of processor cores, their frequency settings, resultant thermal energy and power consumption, and other such related parameters that are aimed at correctly calculating the total power or energy consumption.

The workload calibration step is performed whenever a new job is submitted to the data center. For example, the user may be given a choice to either run the job at maximum performance, i.e., without any application of DVFS, or to run the job in an energy-efficient manner, choosing the best energy-performance tradeoff using DVFS. When the user accepts the choice of running the job in an energy-efficient manner, the job may be tagged as a 'green' job. For all jobs, certain workload characteristics, such as job run-time, and associated performance counter data may be measured. For 'green' jobs, various additional aspects of the job may be measured, such as total energy consumption for a given processor frequency, and the average power consumption. This energy consumption data may be associated with the time taken for the job to complete and other performance counter data, such as average clock cycles per instruction and the like.

Based on the data center cluster characteristics recorded in the data center calibration step, it is possible to create a mathematical model that predicts the performance change in the job for various processor frequency settings. This mathematical model can then be used to predict the job compute performance for a given energy consumption, such that it is possible to accurately estimate the energy-performance characteristics of the job without necessarily having to run the job at various CPU frequency settings. Typically, such a model can be a linear or simple nonlinear regression model, where the characteristics of the model are certain numbers which are the coefficients of the linear or nonlinear regression equation, and the variables may be CPU frequency and run-time or related performance counters such as cycles-per-instruction (CPI).

The energy-performance prediction model specific to the job, related to the particular cluster on which it was submitted, and the associated energy and performance related data recorded during calibration, are then stored in a database. At a later time, when the user resubmits the job as a 'green' job, the stored data and prediction model may be recalled from the database and used to arrive at a particular DVFS setting that is energy-performance optimal. In the case of an individual job, the term 'energy-performance optimal' refers to optimizing a measure such as the energy-delay product, which is a way of characterizing the energy-performance optimality of the job. The model would seek to predict a CPU frequency for which the energy-delay product is a minimum for the individual job, with an acceptable degradation in job performance (run-time).

In this manner, a given job queue may have various jobs that are candidates for DVFS (being 'green' jobs). The characteristics of the queued jobs that were stored during calibration, such as execution time and average power consumption, are used to simulate the scheduling of these jobs in a backfill-based schedule simulation model (that uses the same scheduling algorithms as are being employed in the data center). The set of 'green' jobs for which DVFS is to be applied can be called the DVFS Candidate Set, D. For the set D, let d characterize the DVFS settings of the hardware. The parameter d can be simply the factor by which CPU frequency is to be multiplied, or it could be the CPU voltage setting, or a combination of both, and could include hardware settings for energy optimization. For the current discussions, we will simply assume that d is indicative of the frequency to which the CPU must be set (out of a choice of frequencies). Note that this value of d could vary from job to job. Therefore, it is possible that d is a vector of parameter values, with one or more values for each job in the queue.

The method then takes steps to minimize the energy-performance product of the schedule $$E=E(f,d) \quad (19)$$

where E(f,d) is a measure of energy-performance of the schedule such as the energy-wait-time product. E is ultimately a function of the job run-time overestimation factor f, and (for example) the CPU frequency relaxation factor d. Again, note that the overestimation factor f could also vary depending upon the size of the job, so that f can also be a vector of parameter values, with one value for each job in the queue.

A backfill-based scheduler is simulated by a computer program. To this simulation, jobs are queued as input, with the intention of 'virtually' scheduling the jobs to determine the performance of the scheduling algorithm. Thus, the input to the schedule simulation model are job characteristics such as job run-times, arrival times, deadlines (if any), number of cores needed, other parameters such as average power consumption (if the job is a candidate for DVFS), etc. The job run-time overestimation factor, f, and the DVFS related parameter, d, are also given as inputs per job, to the schedule simulator. The schedule simulation then simulates the execution of the jobs, and it is possible to estimate a schedule performance metric, such as the average wait time, for a given f and d. An optimization algorithm (such as a genetic algorithm) may then be applied to search for the value of f at which the schedule performance is maximized. It may be possible to also vary d. For example, d can be a multiple of the CPU frequency. This means that the CPU frequency can be varied for the DVFS candidate job set. In this manner, both f and d can be varied, and identify the value off and d that optimized an energy-performance measure of the schedule, such as energy-wait time product.

In one example embodiment, the simulation varies the run-time overestimation f of the jobs and, for each new f value, measures schedule performance, such as average wait time, and also the schedule energy-performance metric, such as energy-wait time product. In this manner, a search on the job schedule is performed (possibly using an optimization algorithm or technique, which could incorporate learning from historical information) to come up with the f for a given d, that gives an optimal value of the energy-performance metric of the schedule, such as the energy-wait time product. The optimization technique can allow for the variation of both f and d. In order to maximize the energy-performance metric of the jobs (such as energy-delay product), the algorithm will attempt to modify the d value of jobs that were given a higher priority for application of DVFS, by the least amount.

Another embodiment of the invention provides a computer program product including computer usable program code embodied on a computer usable medium for job scheduling in a manner that balances energy consumption and schedule performance. The computer program product comprises: computer usable program code for identifying job performance data for a plurality of representative jobs; computer usable program code for running a simulation of backfill-based job scheduling of the plurality of jobs at various combinations of a run-time over-estimation value and a processor adjustment value, wherein the simulation generates data including energy consumption and job delay; computer usable program code for identifying one of the combinations of a run-time over-estimation value and a processor adjustment value that optimize the mathematical product of an energy consumption parameter and a job delay parameter using the simulation generated data for the plurality of jobs; and computer usable program code for scheduling jobs submitted to a processor using the identified combination of a run-time over-estimation value and a processor adjustment value. It should be recognized that the computer program product may include further computer usable program code to implement or cause implementation of any one or more aspect of the computer-implemented methods disclosed herein.

FIG. 1 is a flowchart of an energy-aware backfill scheduling method in accordance with one embodiment of the present invention. The computer-implemented method 10, comprises: (step 12) identifying job performance data for a plurality of representative jobs; (step 14) running a simulation of backfill-based job scheduling of the plurality of jobs at various combinations of a run-time over-estimation value and a processor adjustment value, (step 16) generating data including energy consumption and job delay; (step 18) identifying one of the combinations of a run-time over-estimation value and a processor adjustment value that optimize the mathematical product of an energy consumption parameter and a job delay parameter using the simulation generated data for the plurality of jobs; and (step 20) scheduling jobs submitted to a processor using the identified combination of a run-time over-estimation value and a processor adjustment value.

Figure 2:
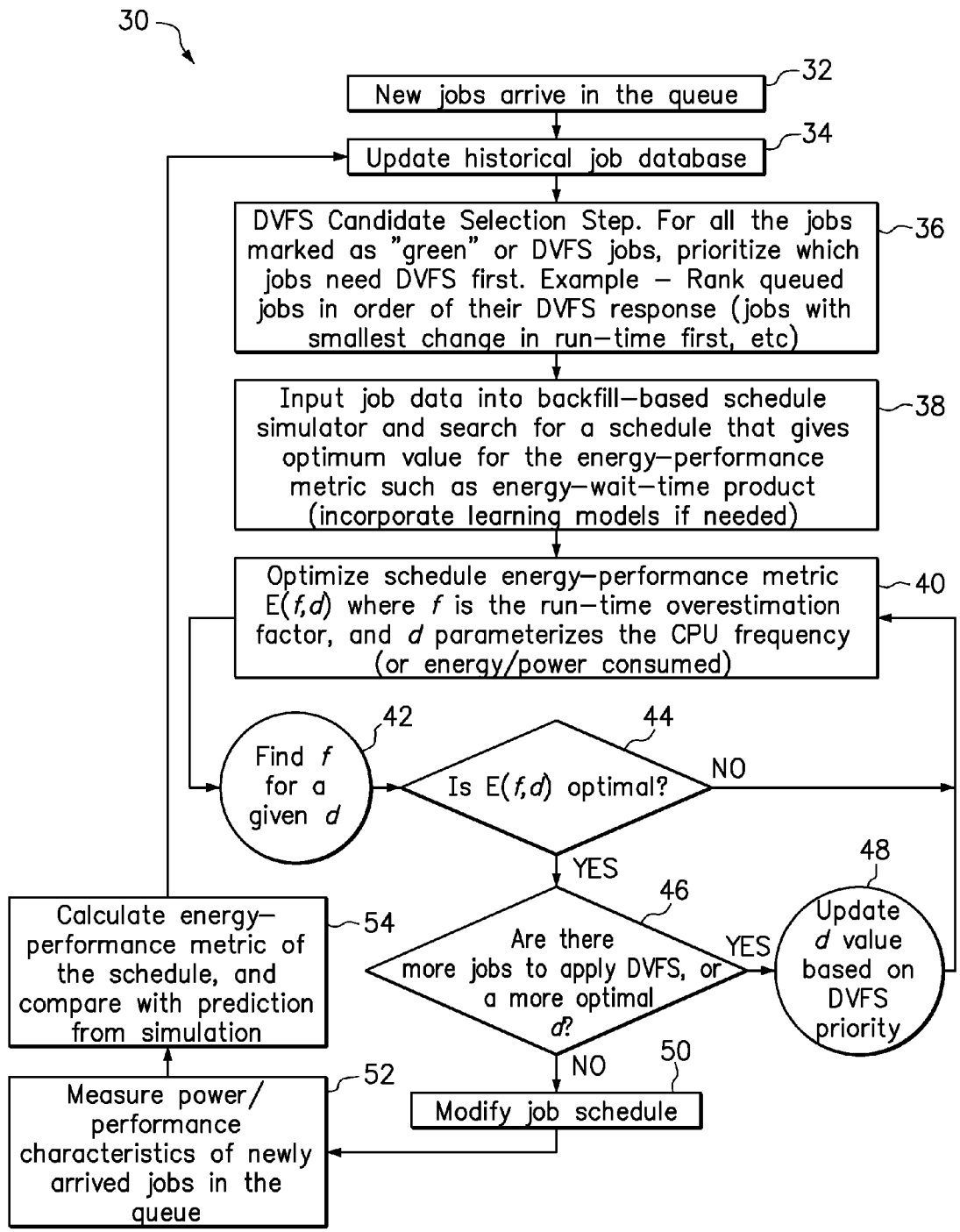
FIG. 2 is a flowchart of an energy-aware backfill scheduling method in accordance with one embodiment of the present invention.

FIG. 2 is a flowchart of an energy-aware backfill scheduling method 30 in accordance with one embodiment of the present invention. Specifically, the flowchart may be described as illustrating an ROC-DVFS Backfill Scheduling method. In other words, the DVFS backfill scheduling is combined with Runtime Overestimation Compensation (ROC) in order to optimize the energy-wait time product.

In step 32, new jobs arrive in the queue to be run by a system having at least one processor. If jobs are already being run on the processor, step 34 updates a historical job database. Then, in step 36, DVFS candidate jobs are selected. For all the jobs marked as "green" or DVFS jobs, this step prioritizes which jobs should be run applying DVFS. One example of how to prioritize these jobs, includes ranking queued jobs in order of their DVFS response (i.e., jobs with the smallest change in run-time first, etc.).

In step 38, job data is input into a backfill-based schedule simulator, which searches for a schedule that gives optimum value for the energy-performance metric, such as energy-wait-time product. When searching for the optimal schedule, it may be beneficial to incorporate machine learning algorithms into the optimization methodology used for the search (in addition to other optimization algorithms used in the search). These machine learning algorithms can "learn" from historical job scheduling data (including the accompanying optimal settings for DVFS and ROC) and potentially lead to more optimal and faster solutions. The machine learning algorithms may be used after evaluating their potential effectiveness (e.g., comparing the value of the energy-wait-time product resulting from the usage of such algorithms along with other search algorithms when searching for the optimal schedule, with the case when the machine learning algorithms are not used in the search for the optimal schedule, during trial runs. As described further in step 40, the simulation optimizes a schedule energy-performance metric E(f,d), where f is the run-time over-estimation factor, and d is a processor parameter, such as CPU frequency, CPU voltage, or both. Ultimately, a change in d changes the power consumed by the CPU (as seen in equation [14]). In fact, the parameter d can be used in more general terms, to parameterize the power (and hence energy) consumed by the hardware during the time a given job is running.

In the embodiment of the method 30 of FIG. 2, step 42 finds the best over-estimation factor (f) for a given processor adjustment value (d). If step 44, determines that E(f,d) is not optimal for the given value of d, then the method returns to step 40. If step 44 determines that E(f,d) is optimal for the given value of d, then step 46 determine whether there are more jobs to which DVFS may be applied, or whether there is a more optimal d for any of the DVFS jobs. If the answer to the determination in step 46 is "yes", then the value based on DVFS priority is updated in step 48 before returning the method to step 40. However, if the determination in step 46 is "no", then the job schedule is modified in step 50. Next, step 52 measures power/performance characteristics of newly arrived jobs in the modified job scheduling queue, and step 54 calculates an energy-performance metric of the schedule that is compared with the prediction from the simulation. The method may then return to step 34 to update the historical job database. It should be recognized that the method is preferably an ongoing iterative process that adapts to incoming jobs and learns from experience how to best optimize the energy-performance metric.

EXAMPLES

Example 1

Figure 3:
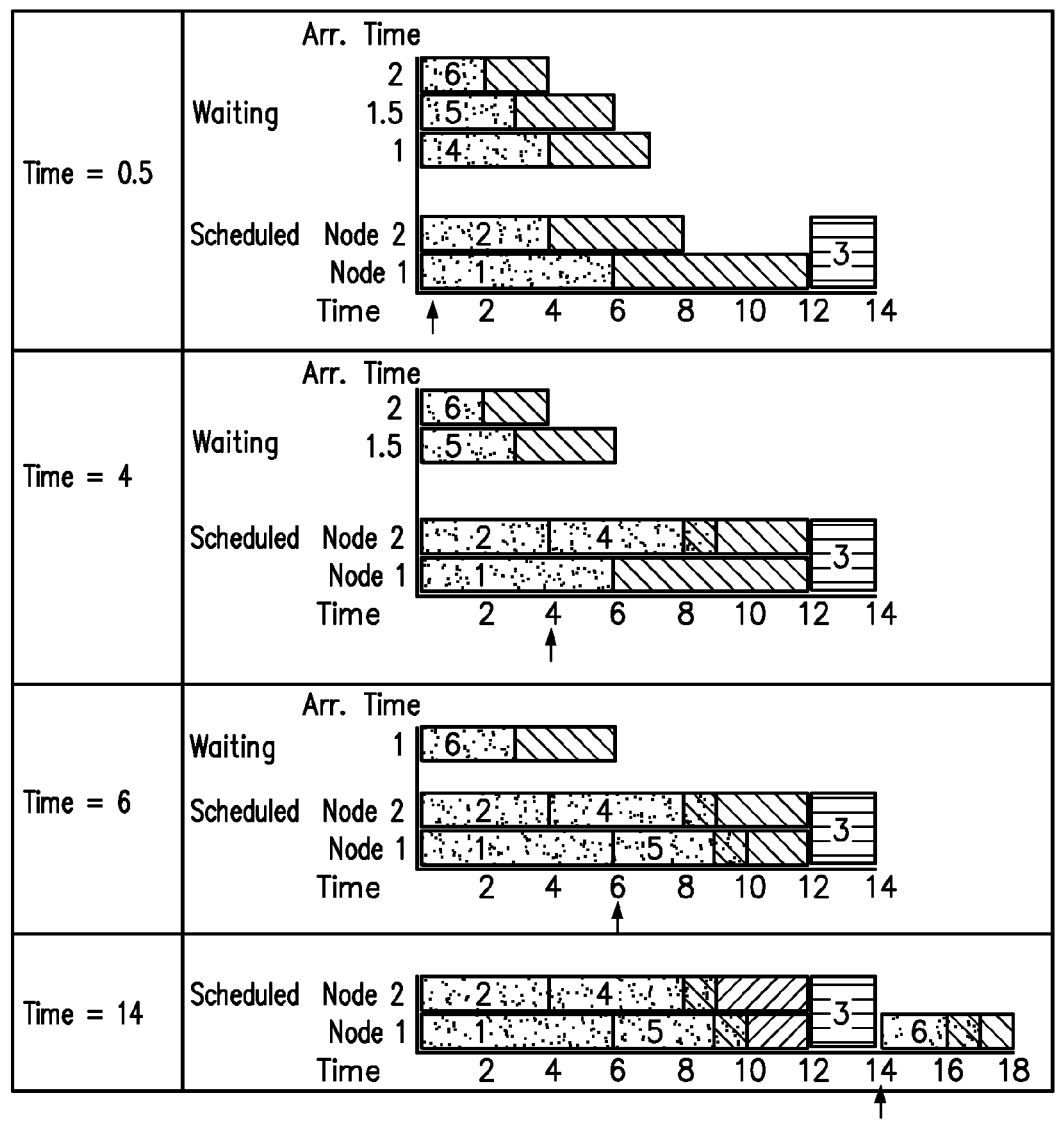
FIG. 3 is a diagram illustrating the scheduling of six jobs on two nodes using backfill scheduling and dynamic voltage and frequency scaling (DVFS), without using the energy-aware backfill scheduling method of FIG. 1.

FIG. 3 illustrates the performance of a scheduling method that uses run-time over-estimation and DVFS, but does not run a simulation to optimize an energy-wait time product. Generally, the application of DVFS to jobs has two major effects. First, the overall execution time of some of the DVFS candidate jobs could increase, leading to an increase in the delay (or wait time) felt by other jobs, and correspondingly increasing both the average wait time and average slowness. Second, due to the increased execution time of DVFS candidate jobs, for a constant run-time overestimation factor, the temporal gap (shadow-time) for backfill reduces, thus preventing jobs that could have backfilled in those shadow-time gaps in the absence of DVFS application—again this contributes to an increase in the average wait time and slowness. Therefore, when DVFS is applied after run-time overestimation is done on a schedule, the application of DVFS could potentially cause the schedule performance to worsen.

Specifically, FIG. 3 is a diagram illustrating the scheduling of six jobs on two nodes using backfill scheduling and dynamic voltage and frequency scaling (DVFS), without using the energy-aware backfill scheduling method of FIG. 2. This figure shows the six incoming jobs, numbered in the sequence of their arrival. Jobs appear at ½ hour intervals and are either scheduled on the resource or placed in the wait queue. At the beginning, all jobs in the wait queue are those that will backfill, and jobs that are already scheduled on the nodes are the advance-reserved jobs. Referring to the legend in the upper right hand corner of FIG. 3, the actual run-times of the jobs is shown without any marks, and the overestimate is shown in hash marks (upper left to lower right). Job 3 (shown by horizontal lines) differs from other jobs in the queue, in that it requires both nodes (Node 1 and Node 2), and therefore must necessarily be reserved only at the earliest time both nodes are available. Because of the choice of job run times and overestimates, job 3 is the last advance-reserved job, and hence, any overestimate of its time does not influence the scheduling performance, as will be seen in further analysis. Therefore, run time overestimates for job 3 are not shown in the figures explicitly (although indicated in Table 1, below, as appropriate). The weighted average slowness is the ratio of the average wait time, to the average (original, i.e. pre-DVFS) run time.

At time T0.5 on the horizontal timeline, job 1 is "scheduled" to be run on a first node (row) and job 2 is scheduled to be run on a second node (row), while jobs 4, 5 and 6 are "waiting" to be scheduled. Job 3 requires both nodes and has a reservation from time T12 to T14. Note the difference between the actual run-time (no marks) and the run-time-overestimate (hashed upper left to lower right) for each of the jobs.

At time T4, job 2 has completed, such that job 4 (the first job received that will fit in the time gap from T4 to T12) is back-filled onto the second node. Job 4 is divided into three regions, that for the actual run-time at maximum performance (no markings), that indicating the increased run-time due to DVFS (wavy lines), and that attributable to the run-time overestimate (hashed upper left to lower right).

At time T6, job 1 has completed, such that job 5 is back-filled onto the first node. Like job 4, job 5 shows the actual run-time at maximum performance, extended run-time due to DVFS, and the run-time over-estimate.

At time T14, job 3 completes and job 6 is scheduled on the first node. Notice that the slack between T9 and T12, just prior to reserved job 3, is too short to back-fill job 6 with DVFS and overestimation. As a result, job 6 is scheduled on the first node at the first opportunity after job 3.

Table 1A, below, shows how the jobs in FIG. 3 are scheduled and performed, and Table 1B, below, shows performance data for the entire schedule of FIG. 3.

TABLE 1A

Job Scheduling and Performance

| Job No. | Arrival Time | Actual run time | DVFS run time | Over-estimated run time | Wait time | Actual Slowness | DVFS Slowness | Frequency factor (d) |
|---|---|---|---|---|---|---|---|---|
| 1 | 0 | 6 | 6 | 12 | 0 | 1.00 | 1 | 1 |
| 2 | 0 | 4 | 4 | 8 | 0 | 1.00 | 1 | 1 |
| 3 | 0.5 | 2 | 2 | 4 | 11.5 | 6.75 | 4.51 | 1 |
| 4 | 1 | 4 | 4.05 | 8 | 3 | 1.76 | 4.25 | 0.9 |
| 5 | 1.5 | 3 | 3.05 | 6 | 4.5 | 2.52 | 3.75 | 0.9 |
| 6 | 2 | 2 | 2.05 | 4 | 12 | 7.03 | 5 | 0.9 |

TABLE 1B

Schedule Performance

| DVFS-Applicatble Jobs | DVFS-Applicable time | Over-estimation factor | Avg. Wait time | Avg. Slowness | Wtd. Avg. Slowness | Avg. Energy Consumed |
|---|---|---|---|---|---|---|
| 3 | 17 | 2 | 5.17 | 3.34 | 1.48 | 3.3725 |

Example 2

Figure 4:
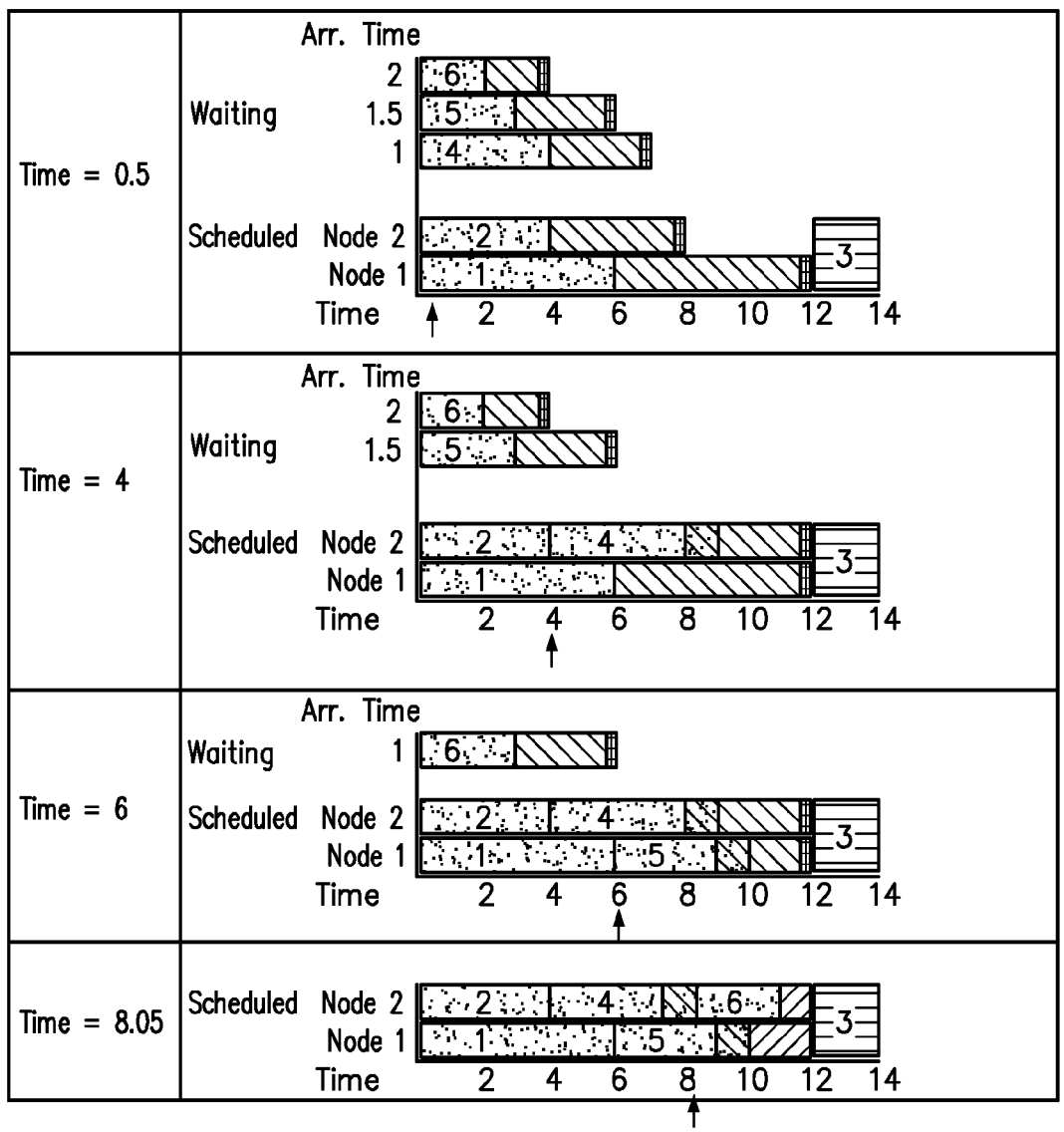
FIG. 4 is a diagram illustrating the scheduling of the same six jobs on the same two nodes as in FIG. 2 using the energy-aware backfill scheduling method of FIG. 1.

FIG. 4 illustrates the performance of a scheduling method that uses run-time overestimation compensated DVFS-backfill (ROC-DVFS backfill) in accordance with the present invention. During simulation, an optimal energy-wait time product is achieved with a run-time overestimation factor of 2.025 (an increase of only 0.025 from the run-time overestimation factor of 2 in Example 1. However, as shown, the schedule performance increases. For example, the average wait time drops from 5.17 hours (Example 1) to 4.20 hours (Example 2), and the average slowness drops from 3.34 (Example 1) to 2.86 (Example 2). This increase in schedule performance occurs because jobs that could not be backfilled in Example 1 due to the reduced size of temporal gaps caused by the application of DVFS, are now able to backfill since the temporal gaps are increased by the greater run-time overestimation factor. Another reason for the increase in schedule performance is that the application of DVFS causes the job size distribution to change, i.e., the number of larger jobs increases. Such larger jobs may also not backfill when their run-time overestimate increases, thus potentially making way for smaller jobs to backfill in the spatio-temporal gaps of the larger jobs.

FIG. 4 is a diagram illustrating the scheduling of the same six jobs on the same two nodes as in FIG. 3, but using an energy-aware backfill scheduling method in accordance with the present invention.

At time T0.5, job 1 is "scheduled" to be run on a first node (row) and job 2 is scheduled to be run on a second node (row), while jobs 4, 5 and 6 are "waiting" to be schedules. Job 3 requires both nodes and has a reservation from time T12 to T14. Note that jobs 1, 2, 4, 5 and 6 have a dark region on the right end to represent the extended run-time overestimate for ROC-DVFS.

At time T4, job 2 has completed, such that job 4 is backfilled onto the second node. Job 4 is divided into four regions (described from left to right), that for the actual run-time at maximum performance (no markings), that indicating the increased run-time due to DVFS (wavy lines), that attributable to the run-time over-estimate (hashed upper left to lower right), and that attributable to the extended run-time over-estimate (dark).

At time T6, job 1 has completed, such that job 5 is backfilled onto the first node. Like job 4, job 5 shows the actual run-time at maximum performance, extended run-time due to DVFS, the run-time over-estimate, and the extended run-time over-estimate.

At time T8.05, job 4 completes and job 6 is backfilled into the slack between T8.05 and T12, just prior to reserved job 3.

Note that DVFS was applied to three jobs in both of Examples 1 and 2, yet the weighted average slowness dropped from 1.48 (Example 1) to 1.20 (Example 2).

The dark hatched lines (upper right to lower left) in FIG. 4 (See Time T8.05) represent the times and resources (or jobs) over which DVFS may be applied, i.e., jobs may be run at lower CPU (or other hardware) energy costs. In other words, there exists a slack in the run-time of those jobs (5 and 6 in FIG. 4), which could be leveraged by reducing energy consumption, but without affecting the overall backfill configuration, and consequently, the average wait times and slownesses of the other jobs. Such slack may be referred to as "backfill-invariant DVFS opportunities" to indicate the potential of leveraging the temporal slack for DVFS, without affecting the backfill configuration. Also note that apart from the compute resources occupied by jobs 5 and 6, other compute resources may also exist which might not be used, as no job could be backfilled in those remaining) resources. Such resources could be essentially powered off (or set to idle mode). However, resources such as those occupied by jobs 5 and 6 cannot be powered off or set to idle, until jobs 5 and 6 complete. On the other hand, it would be possible to apply DVFS to jobs 5 and 6, therefore consuming less energy (power and cooling).

The present methods identify an optimal tradeoff or balancing between the extreme choices of (a) running jobs 5 and 6 at the lowest possible energy, and (b) running jobs 5 and 6 at maximum performance followed by powering off the CPUs or resources previously occupied by jobs 5 and 6 after their completion.

Accordingly, it is possible to save energy during slack periods arising from job run-time overestimation. The greater the overestimation factor, the more will be the spatio-temporal "resource gaps" into which jobs cannot be backfilled, and therefore, resources can either be powered off during these gaps, or DVFS can be applied on the jobs prior to these gaps, or some energy-optimal alternative may be computed, such that DVFS is applied part of the time, while resources are powered off for the rest of the time.

Table 2A, below, shows how the jobs in FIG. 4 are scheduled and performed, and Table 2B, below, shows performance data for the entire schedule of FIG. 4.

TABLE 2A

Job Scheduling and Performance

| Job No. | Arrival Time | Actual run time | DVFS run time | Over-estimated run time | Wait time | Actual Slowness | DVFS Slowness | Frequency factor (d) |
|---|---|---|---|---|---|---|---|---|
| 1 | 0 | 6 | 6 | 12.15 | 0 | 1.00 | 1 | 1 |
| 2 | 0 | 4 | 4 | 8.1 | 0 | 1.00 | 1 | 1 |
| 3 | 0.5 | 2 | 2 | 4.05 | 11.65 | 6.83 | 4.51 | 1 |
| 4 | 1 | 4 | 4.05 | 8.1 | 3 | 1.76 | 4.25 | 0.9 |
| 5 | 1.5 | 3 | 3.05 | 6.075 | 4.5 | 2.52 | 3.75 | 0.9 |
| 6 | 2 | 2 | 2.05 | 4.05 | 6.05 | 4.05 | 5 | 0.9 |

TABLE 2B

Schedule Performance

| DVFS-Applicatble Jobs | DVFS-Applicable time | Over-estimation factor | Avg. Wait time | Avg. Slowness | Wtd. Avg. Slowness | Avg. Energy Consumed |
|---|---|---|---|---|---|---|
| 3 | 17 | 2.025 | 4.20 | 2.86 | 1.20 | 3.3725 |

Example 3

Figure 5:
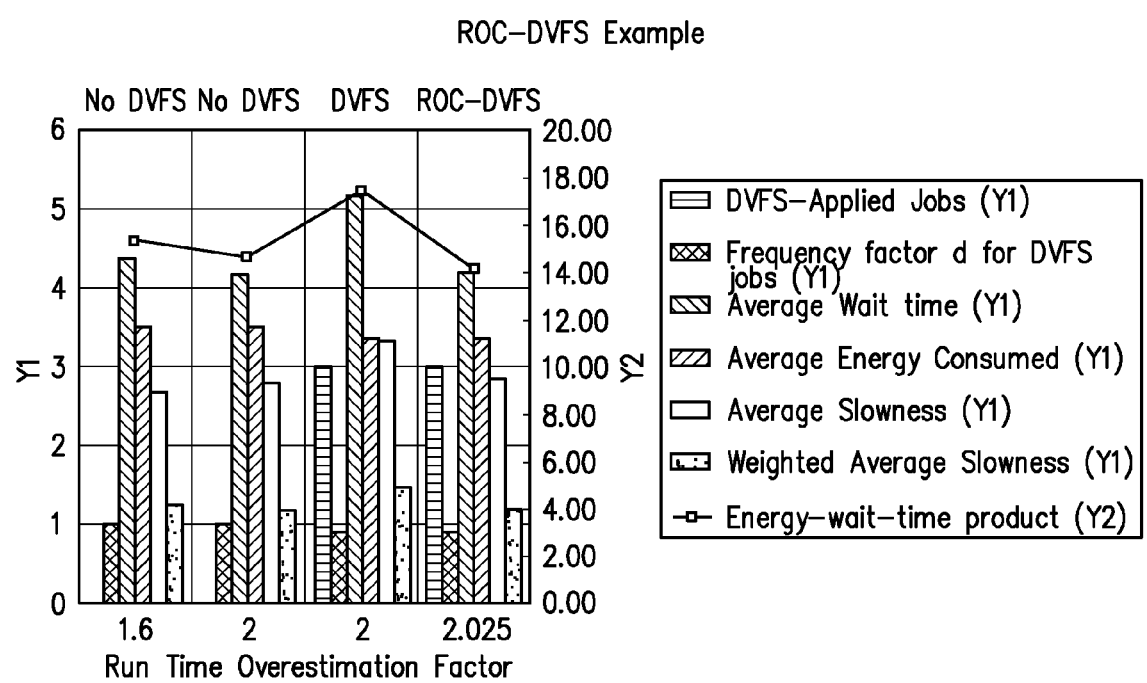
FIG. 5 is a table of data, and a graph illustrating the data, comparing the energy-wait time product resulting from four different combinations of the average over-estimation factor and the application of DVFS.

FIG. 5 provides a graph showing the improvement in scheduling performance after using ROC-DVFS backfill, in accordance with one embodiment of the present invention. Specifically, FIG. 5 compares the energy-wait time product resulting from four different combinations of the average over-estimation factor f (see column 4) and the frequency factor d (see column 9). For these four cases, FIG. 5 shows the DVFS-Applied Jobs, the Frequency factor d used for DVFS Jobs, the Average Wait Time, the Average Energy Consumed, the Average Slowness, the Weighted Average Slowness, and the Energy-Wait-Time Product.

TABLE 3

| DVFS-Applied Jobs (Y1) | DVFS-Applied time | Average Energy Consumed (Y1) | Average over-estimation factor | Comment | Average Wait time (Y1) | Average Slowness (Y1) | Weighted Average Slowness (Y1) | Frequency factor d for DVFS jobs (Y1) | Energy-wait-time product (Y2) |
|---|---|---|---|---|---|---|---|---|---|
| 0 | 0 | 3.5 | 1.6 | No DVFS | 4.37 | 2.67 | 1.25 | 1.00 | 15.28 |
| 0 | 0 | 3.5 | 2 | No DVFS | 4.17 | 2.79 | 1.19 | 1.00 | 14.58 |
| 3 | 17 | 3.3725 | 2 | DVFS | 5.17 | 3.34 | 1.48 | 0.90 | 17.42 |
| 3 | 17 | 3.3725 | 2.025 | ROC-DVFS | 4.20 | 2.86 | 1.20 | 0.90 | 14.16 |

While there is a potential for schedule performance numbers to reduce as much as to reach values prior to DVFS application (i.e., "perfect compensation"), the performance of individual jobs in the schedule may not match their corresponding performance in the non-DVFS case. In many cases, the ROC-DVFS schedule performance could remain lower than in the non-DVFS case. However, the ROC-DVFS technique is intended to optimize the schedule energy performance optimality. The energy-performance optimality for this example may be measured through the energy-wait-time product, which, for the sake of illustration in this analysis, can be loosely defined as the product of the average wait-time and the average energy expended in running a job. The optimal energy-wait time product has the value of 14.16, as shown in the last row of the table in FIG. 5. Notice that the Average Wait-Time, Average Slowness, and Weighted Average Slowness are all slightly lower in the second row than in the last row. The method of the present invention will optimize the energy-wait time product and select to run the jobs according to the last row, even though running the jobs according to the second row would optimize performance only.

Explanation of One Embodiment Using Equations

Terminology

The following terminology may be used to characterize the energy consumption and performance of a schedule. Let a scheduler (equivalently, a scheduling algorithm) S, comprise of M queues, i.e., $$S = \{Q_1(T_1), \ldots, Q_M(T_M)\} \quad (1)$$

where $T_i$ is the time-limit (i.e., the maximum run-time that a submitted job can take, after which it is killed by S), for the queue $Q_i$.

Let $J_i$ represent the total number of jobs submitted to queue $Q_i$, and $j_m(i)$ represent the m-th job submitted to $Q_i$. We will also denote by J, the total number of jobs submitted to S, i.e., $$J = \sum_{i=1}^{M} J_i \quad (2)$$

and the first-come-first served (FCFS) sequence of job submission (i.e., jobs arranged in the temporally increasing order of submission), by:

$$Q = \{j_1, \ldots, j_J\} \quad (3)$$

where ties in equation 3 (i.e., the circumstances when two or more jobs are submitted at exactly the same time), are broken randomly, i.e., jobs submitted at the same time are placed in the queue in random order.

We denote by N the total number of processors in the compute resource, and the number of processors used by the i-th job in the sequence Q of equation 3 above will be denoted by $n_i$.

Let the actual run-time of $j_i$ be represented by $r_i$, the schedule-estimated run-time of $j_i$ be represented by $v_i$ and the user-estimated run-time of $j_i$ be denoted by $u_i$. The schedule-estimated run-time $v_i$ is a function of a prediction of the actual run-time based on historical (analytical) job data, $h_i$ and the user estimated run-time $u_i$. This schedule-estimated run-time is used as the estimated run-time of a submitted job, multiplied by an expansion factor R, that could be a constant, or job-dependent:

$$v = R_i f(u_i, h_i) \quad (4)$$

We will also define the time of submission of $j_i$ by $s_i$, and the time at which the job starts execution by $t_i$.

Scheduling performance characteristics include the time between the submission of a job $j_i$ into Q, and the time at which the job starts executing, is called the wait time, denoted by $w_i$:

$$w_i = t_i - s_i \quad (5)$$

Note that:

$$\sum_{l=1}^{i} r_l \leq w_i \quad (6)$$

Also, the bounded slowdown of job $j_i$ is the ratio of the sum of wait-time and (actual) run-time, normalized by the run-time. In order to bound this ratio for jobs that might take very short times to complete, the normalization is done by using a maximum of some constant c, and the run-time of the job:

$$b_i = \frac{w_i + r_i}{\max(c, r_i)} \quad (7)$$

Two primary parameters that are used to measure the performance of a schedule are the average wait time, $<w>$, and the average bounded slowdown, $<b>$:

$$<w> = \frac{1}{J} \sum_{i=1}^{J} w_i \quad (8)$$

$$<b> = \frac{1}{J} \sum_{i=1}^{J} b_i \quad (9)$$

Let $p_k$ be the total power consumed by the k-th processor, and $p_{k,i}$ represent the power consumed due to running the i-th job $j_i$ on the k-th processor. We will also represent the idle power consumed by the k-th processor (i.e., the power consumed when no task is running on the processor), by $o_k$.

$$p_k = \sum_{i=1}^{J} p_{k,i} + o_k \quad (10)$$

being the net idle power of the compute resource:

$$O = \sum_{k=1}^{N} o_k \quad (11)$$

with P representing the total power consumption of the compute resource:

$$P = \sum_{k=1}^{N} p_k \quad (12)$$

We also denote by $z_k$ the total time for which the k-th resource is idle (i.e., no job is running on it). The set of applications that run on a processor k is denoted by $\Omega_k$. Each application would consume a different amount of power, and therefore $p_k$ is a function of the job and its actual run-time on the processor, i.e., $p_k = p_k(r_l)$, $l \in \Omega_k$.

Power Consumption Model

CPU power consumption is modeled as the sum of dynamic and static powers:

$$p = p_{dynamic} + p_{static} \quad (13)$$

where:

$$p_{dynamic} = ACfV^2 \quad (14)$$

$$P_{static} = \alpha V \quad (15)$$

and where A is the activity factor, which is assumed constant over applications, but 2.5 times higher when the CPU is active, than when idle. The constant C is the capacity, f is the frequency and V is the voltage. The parameter $\alpha$ is a function of the total static power of the CPU. Power consumed by other hardware is also assumed to have models that account for their active and idle consumptions.

Energy Consumption and Related Parameters in the Schedule

We denote the total energy consumed by the computing resource while running J submitted jobs, by E, which is the sum of energies consumed by each processor, $e_k$:

$$E = \sum_{k=1}^{N} e_k = \sum_{k=1}^{N} \left( o_k z_k + \sum_{l \in \Omega_k} p_{k,l} r_l \right) \quad (16)$$

$$= \sum_{k=1}^{N} \sum_{l \in \Omega_k} p_{k,l} r_l + \sum_{k=1}^{N} o_k z_k$$

Equation 16 shows that the total energy consumed by the compute resource is not only a function of the power consumed by an application and its run-time, but also a function of the idling power and the total time the resource is idle.

Energy consumed by the schedule can be compared using the quantity E above, also in conjunction with efficiency measures, such as $<w>$, $<b>$ defined in equations 8 and 9 respectively. Two more efficiency measures are the ratio of average wait time to average energy consumed, which we will call the wait-time-energy-ratio (WER), and, similarly, the bounded-slowdown-energy-ratio (BER), i.e.:

$$WER = \frac{N<w>}{E} \quad (17)$$

$$BER = \frac{N<b>}{E}$$

DVFS vs. Original Parameters

In order to distinguish scheduling during the application of DVFS, we will denote this quantity by the term $E_{DVFS}$, relative to the energy consumption of the original schedule, viz., $E_{ORG}$.

Job Run-time vs. Frequency Prediction Model

Job run-times may be predicted with change in CPU frequency, although the extent to which frequency scaling affects computation time depends on the application memory boundedness and its communication intensity. An execution time model may be based on the following equation:

$$T(h)/T(h_{max})=\beta(h_{max}/h-1) \qquad (18)$$

where $T(h)$ is a job run time at CPU frequency h, $T(h_{max})$ is the job run time at the top frequency $h_{max}$. It works for both sequential and parallel applications as there is no difference whether the CPU is waiting for data from the memory system or from an another node. $\beta$ measures the extent to which an application is CPU-bound. $\beta=1$ means that halving frequency doubles the execution time whereas $\beta=0$ means that a change in frequency does not affect the execution time. In one embodiment, $\beta$ is assumed to be 0.5."

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer usable program code embodied on a non-transitory computer usable medium, the computer program product comprising:
    computer usable program code for identifying job performance data for a plurality of representative jobs;
    computer usable program code for running a simulation of backfill-based job scheduling of the plurality of jobs at various combinations of a run-time over-estimation value and a processor adjustment value, wherein the processor adjustment value is selected from a processor frequency value, a processor voltage value, and a combination thereof, and wherein the simulation generates data including energy consumption and job delay;
    computer usable program code for identifying one of the combinations of a run-time over-estimation value and a processor adjustment value that optimize the mathematical product of an energy consumption parameter and a job delay parameter using the simulation generated data for the plurality of jobs; and
    computer usable program code for scheduling jobs submitted to a processor using the identified combination of a run-time over-estimation value and a processor adjustment value.

2. The computer program product of claim 1, wherein the processor is enabled for dynamic frequency and voltage scaling.

3. The computer program product of claim 1, wherein identifying job performance data for the plurality of jobs includes accessing historical job performance data.

4. The computer program product of claim 1, further comprising:
    computer usable program code for estimating the run-time of each job; and
    computer usable program code for multiplying the run-time estimate by the run-time over-estimation factor to determine a run-time over-estimate for each job.

5. The computer program product of claim 4, wherein the run-time estimate is based on historical job data.

6. The computer program product of claim 4, further comprising:
    computer usable program code for scheduling each job within a scheduling queue, wherein the schedule allocates resources necessary to run the job for the duration of the run-time over-estimate.

7. The computer program product of claim 6, wherein the computer usable program code for running a simulation of backfill-based job scheduling of the plurality of jobs includes computer usable program code for promoting a job in the scheduling queue to execute earlier in response to determining that sufficient compute resources are available for the duration of the run-time over-estimate for the promoted job so that earlier execution of the promoted job will not delay execution of a reserved or running job.

8. The computer program product of claim 1, further comprising:
    computer usable program code for measuring the actual energy consumption and job delay of the jobs executed by a processor according to the schedule;
    computer usable program code for updating the job performance data to include actual energy consumption data and actual job delay data associated with the executed jobs.

9. The computer program product of claim 1, wherein the job delay parameter is the average wait time of the plurality of jobs.

10. The computer program product of claim 1, wherein the energy consumption parameter is the average energy reduction ratio of the plurality of jobs.

11. The computer program product of claim 10, wherein the average energy reduction ratio of the plurality of jobs is the average energy consumption without using processor adjustment value divided by the average energy consumption using the processor adjustment value.

12. The computer program product of claim 1, further comprising:
    computer usable program code for running each of the jobs applying dynamic frequency and voltage scaling (DVFS) and without applying DVFS;
    computer usable program code for determining, for each of the jobs, a change in run-time attributed to the application of DVFS; and
    computer usable program code for selecting one or more of the jobs as DVFS candidates beginning with jobs having the smallest change in run-time due to the application of DVFS and continuing with jobs having greater changes in run-time.

13. The computer program product of claim 1, further comprising:
    computer usable program code for calibrating each of the jobs to determine job characteristics including execution time and power consumption, wherein the job characteristics are used by the simulation.

14. The computer program product of claim 1, further comprising:
- computer usable program code for receiving user input identifying that a newly submitted job is to be run applying dynamic frequency and voltage scaling (DVFS);
- computer usable program code for tagging the newly submitted job as a DVFS candidate job; and
- computer usable program code for modeling the relationship between energy consumption and job performance for the DVFS candidate job.

15. The computer program product of claim 14, wherein the computer usable program code for modeling the relationship between energy consumption and job performance for the DVFS candidate job includes:
- computer usable program code for identifying system resources available in the data center;
- computer usable program code for modeling the performance of the system resources for various processor frequency settings;
- computer usable program code for using the performance model of the system resources to estimate the performance of a job for a given energy consumption; and
- computer usable program code for storing the estimated performance and energy consumption data in association with the job.

16. The computer program product of claim 15, further comprising:
- computer usable program code for using the stored performance and energy consumption data to determine a DVFS setting that is energy-performance optimal in response to the job being submitted for scheduling to a processor.

17. The computer program product of claim 16, wherein the DVFS setting that is energy performance optimal is subject to a maximum run-time.

18. The computer program product of claim 16, further comprising:
- computer usable program code for applying the DVFS setting to the DVFS candidate job during execution by a processor; and
- computer usable program code for measuring energy consumption and run-time in response to running the DVFS candidate job at the DVFS setting.

19. The computer program product of claim 15, wherein the computer usable program code for identifying system resources available in the data center includes computer usable program code for identifying the number and type or processor cores, their frequency settings, resultant thermal energy and power consumption.

* * * * *